United States Patent
Yamamura et al.

(10) Patent No.: US 9,008,143 B2
(45) Date of Patent: Apr. 14, 2015

(54) GAS LASER RESONATOR

(71) Applicant: Via Mechanics, Ltd., Ebina-shi, Kanagawa (JP)

(72) Inventors: Hideho Yamamura, Oiso-cho (JP); Goichi Ohmae, Komae (JP); Nobuyoshi Ohtani, Ebina (JP)

(73) Assignee: Via Mechanics, Ltd., Ebina-shi (JP)

( * ) Notice: Subject to any disclaimer, the term of this patent is extended or adjusted under 35 U.S.C. 154(b) by 0 days.

(21) Appl. No.: 14/470,148

(22) Filed: Aug. 27, 2014

(65) Prior Publication Data

US 2015/0063397 A1   Mar. 5, 2015

(30) Foreign Application Priority Data

Aug. 29, 2013 (JP) .................. 2013-178087
Jul. 4, 2014 (JP) .................. 2014-138370

(51) Int. Cl.
| | |
|---|---|
| H01S 3/22 | (2006.01) |
| H01S 3/032 | (2006.01) |
| H01S 3/07 | (2006.01) |
| H01S 3/036 | (2006.01) |
| H01S 3/097 | (2006.01) |
| H01S 3/134 | (2006.01) |

(52) U.S. Cl.
CPC . *H01S 3/032* (2013.01); *H01S 3/07* (2013.01); *H01S 3/036* (2013.01); *H01S 3/09705* (2013.01); *H01S 3/134* (2013.01)

(58) Field of Classification Search
CPC ...... H01S 3/036; H01S 3/09705; H01S 3/134
USPC ........................................ 372/59, 55
See application file for complete search history.

(56) References Cited

U.S. PATENT DOCUMENTS

| | | | |
|---|---|---|---|
| 4,939,738 A * | 7/1990 | Opower | 372/95 |
| 5,237,580 A | 8/1993 | Mefferd | |
| 2002/0044586 A1* | 4/2002 | Myers et al. | 372/57 |

* cited by examiner

*Primary Examiner* — Kinam Park
(74) *Attorney, Agent, or Firm* — Crowell & Moring LLP (57) ABSTRACT

The present invention aims to prevent, in a gas laser resonator, the deterioration in quality of discharge by reduction of the change of the pressure in a discharge chamber and the inflow of impurity gases, such as air, into the discharge chamber. A bracket 6 is attached to one end of a tube 1 interposing a gasket 13 only for sealing an opening of the discharge chamber 2 only and a gasket 14 for sealing both openings of the discharge chamber 2 and a buffer chamber 12. Also, a glass plate 8 and further a bracket 9 are attached to the other end of the tube 1 interposing a gasket 15 only for sealing the opening of the discharge chamber 2 and a gasket 16 for sealing both openings of the discharge chamber 2 and the buffer chamber 12. The pressure in the buffer chamber 12 is set lower than that of the discharge chamber 2 or set higher than the atmospheric pressure to decrease the inflow of the impurity gases to the discharge chamber 2.

5 Claims, 7 Drawing Sheets

GAS LASER RESONATOR

CROSS-REFERENCE TO RELATED APPLICATION

This application claims priority from Japanese Patent Applications No. 2013-178087 filed with the Japan Patent Office on Aug. 29, 2013 and No. 2014-138370 filed with the Japan Patent Office on Jul. 4, 2014, the entire contents of which are hereby incorporated by reference.

BACKGROUND

1. Technical Field

The present invention relates to a gas laser resonator suitable for use with a laser machining apparatus employed to drill an object such as a printed circuit board by using a laser, for example.

2. Related Art

In a known structure of gas laser resonators, a pair of facing electrodes is arranged within an airtight container in which a laser medium gas is sealed and a plasma discharge is generated between the electrodes.

Figure 15:
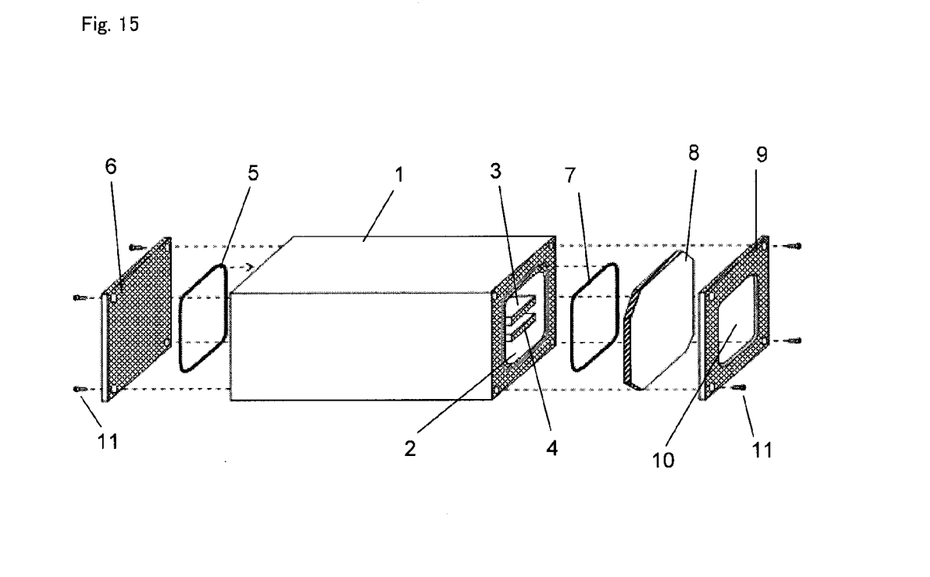
FIG. 15 is an exploded perspective view of a conventional gas laser resonator.

FIG. 15 is an exploded perspective view of such a gas laser resonator. In FIG. 15, inside a rectangular metal tube 1, a square discharge chamber 2 is formed extending from one end to the other end of the tube 1. Inside the discharge chamber 2, a pair of facing electrodes 3 and 4 is arranged. A bracket 6 is attached to one end of the tube 1 with a gasket 5 interposed for sealing, and a glass plate 8 and another bracket 9 are attached to the other end with another gasket 7 interposed for sealing. On the end faces of the tube 1 to which the gaskets 5 and 7 are contact are formed grooves in which the gaskets 5 and 7 are seated, as well known in this field. The discharge chamber 2 is sealed hermetically with a laser medium gas at a pressure of one-tenth of the atmospheric pressure, for example, as usually used in the discharge. The laser generated in the discharge chamber 2 is emitted through the glass plate 8 and emerged out of a window 10 provided in the bracket 9. Elements 11 are screws used for fixing the brackets 6 and 9 to the tube 1.

In such a gas laser resonator, there are problems resulting in a deterioration in quality of the plasma discharge, when a considerable time has elapsed after it has been manufactured, such as a change of the pressure in the interior of the discharge chamber 2 and an inflow of impurity gases, caused by leakage of air or the like into the discharge chamber 2 through imperfections of the gaskets 5 and 7.

For example, the gas laser resonator disclosed in U.S. Pat. No. 5,237,580 (FIG. 1) has the structure as shown in FIG. 15, and no consideration has been made to the problems of the change of the pressure in the discharge chamber and the inflow of impurity gases, caused by leakage of air or the like into the discharge chamber.

SUMMARY

The purpose of the present invention is to prevent, in the gas laser resonator, the deterioration in quality of discharge by reducing the change of the pressure in the discharge chamber and the inflow of the impurity gases, caused by leakage of air or the like into the discharge chamber.

In order to solve the above problems, the gas laser resonator of claim 1 comprises a tube includes a discharge chamber for lasing and sealing parts that are connected to sides of said tube to seal said discharge chamber, wherein the tube further includes a buffer chamber which is different from said discharge chamber and is sealed by said sealing parts, wherein said sealing part comprises a first sealing member provided only to seal said discharge chamber and a second sealing member provided to seal both of said discharge chamber and said buffer chamber, and said discharge chamber and said buffer chamber are sealed hermetically so that their pressures are different from each other.

Further, the gas laser resonator of claim 2 is featured in that, in the gas laser resonator according to claim 1, the pressure in said buffer chamber is lower than the pressure in said discharge chamber.

Further, the gas laser resonator of claim 3 is featured in that, in the gas laser resonator according to claim 2, the pressure in said buffer chamber is a vacuum and the volume of said buffer chamber is equal to or greater than 1/50 of the volume of said discharge chamber.

Further, the gas laser resonator of claim 4 is featured in that, in the gas laser resonator according to claim 1, said buffer chambers are formed in four corners in the periphery of said discharge chamber in said tube when viewed in a transverse sectional view of said tube.

Further, the gas laser resonator of claim 5 is featured in that, in the gas laser resonator according to claim 1, the pressure in said buffer chamber is higher than the atmospheric pressure.

The gas laser resonator according to the present invention can reduce the change of the pressure in the discharge chamber and the inflow of the impurity gases, caused by leakage of air or the like into the discharge chamber, so that the deterioration in quality of discharge can be prevented. Therefore, when applied to the laser resonator for the laser machining apparatus that is used for the machining using the laser, for example, the present invention allows for the advantages of being able to enhance the quality of the laser machining, eliminating the need for the means for detecting or predicting the deterioration in quality of the laser medium gas, eliminating the need for the exchange operation of the laser medium gas for recovering the quality of the laser medium gas, and so on.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiment 1

Figure 1:
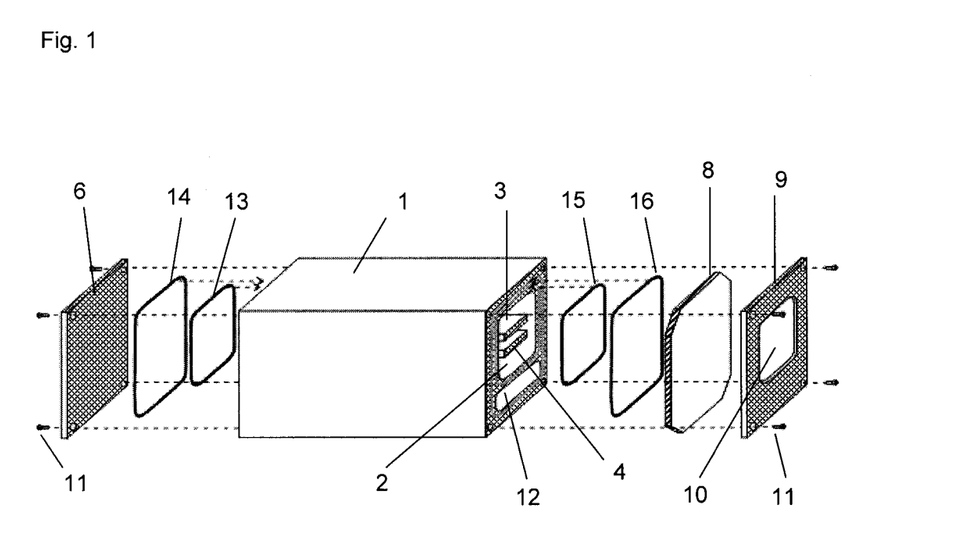
FIG. 1 is an exploded perspective view of a gas laser resonator of an embodiment 1 of the present invention.
Figure 2:
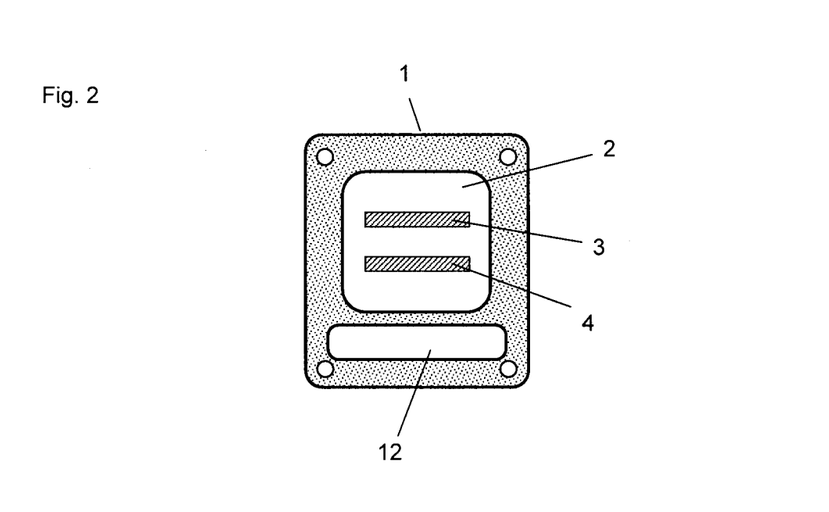
FIG. 2 is a transverse sectional view of a tube of FIG. 1.
Figure 3:
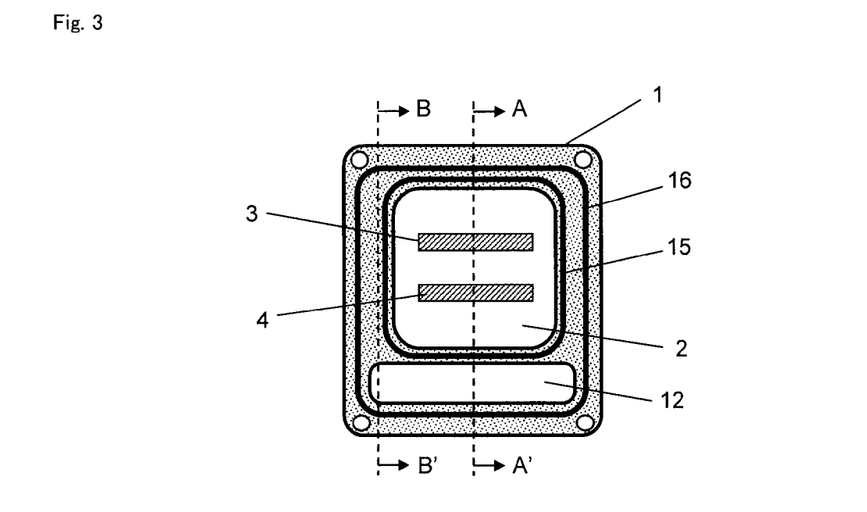
FIG. 3 is a transverse sectional view of the right end sealing part of the tube of FIG. 1 when viewed inward through the glass plate.

The embodiment 1 will be described. FIG. 1 is an exploded perspective view of a gas laser resonator of the embodiment 1 of the present invention, FIG. 2 is a transverse sectional view of a tube of FIG. 1, FIG. 3 is a transverse sectional view of the right end sealing part of the tube of FIG. 1 when viewed inward through the glass plate side, and FIGS. 4 and 5 are sectional views along the lines A-A' and B-B' of FIG. 3, respectively.

In FIGS. 1-5, the same elements as those in the conventional art of FIG. 15 are provided with the same reference numerals, and the differences from FIG. 15 are as follows. It is noted that, in FIGS. 4 and 5, the screws 11 for fixing the brackets 6 and 9 to the tube 1 are omitted, and also omitted from subsequent drawings for simplicity.

Inside the rectangular metal tube 1, another rectangular chamber 12 (hereinafter referred to as the "buffer chamber 12") is provided under the discharge chamber 2 in parallel to the discharge chamber 2 extending from one end of the tube 1 to the other end, similar to the discharge chamber 2. The bracket 6 is attached to the end face of one end of the tube 1 interposing a gasket 13 only for sealing the opening of the discharge chamber 2 and a gasket 14 for sealing both openings of the discharge chamber 2 and the buffer chamber 12. Also, a glass plate 8 and further the bracket 9 are attached to the end face of the other end of the tube 1 with a gasket 15 interposed only for sealing the opening of the discharge chamber 2 and a gasket 16 interposed for sealing both openings of the discharge chamber 2 and the buffer chamber 12. On the end faces of the tube 1 which the gaskets 13 to 16 contact are formed grooves in which the gaskets 13 to 16 are seated, similarly to the arrangement of FIG. 15.

Figure 4:
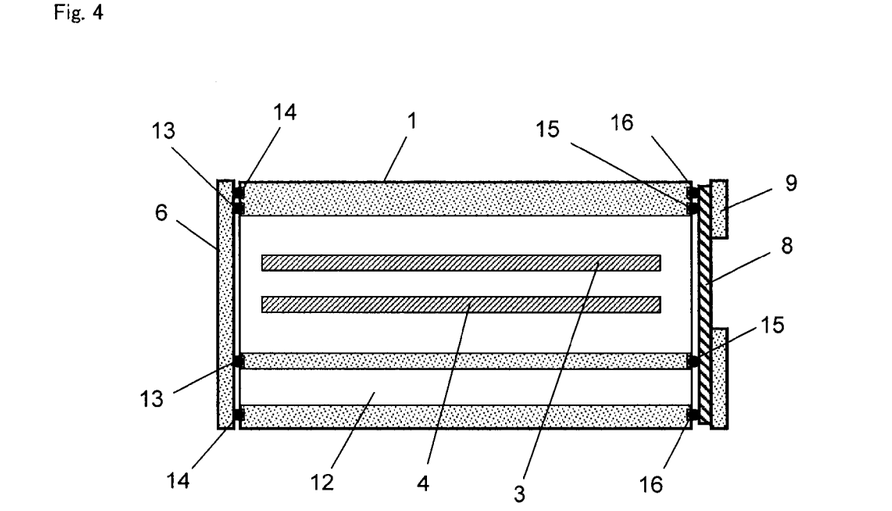
FIG. 4 is a sectional view along the line A-A' of FIG. 3.
Figure 5:
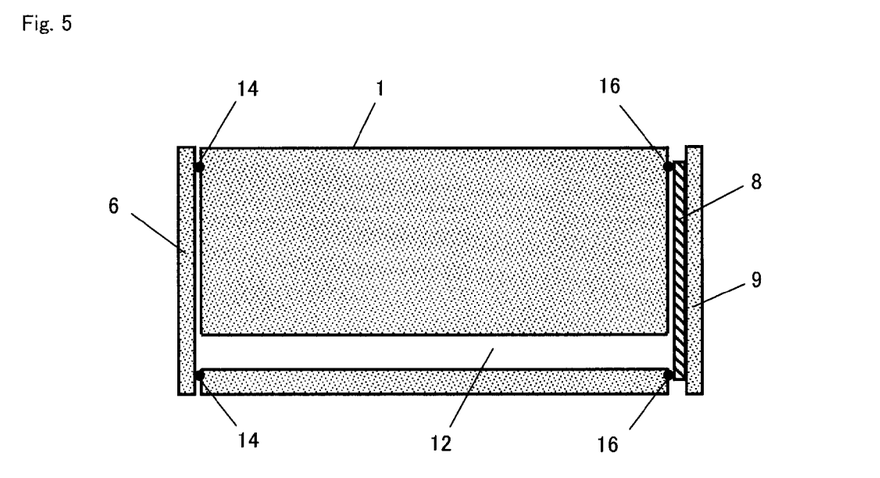
FIG. 5 is a sectional view along the line B-B' of FIG. 3.
Figure 6:
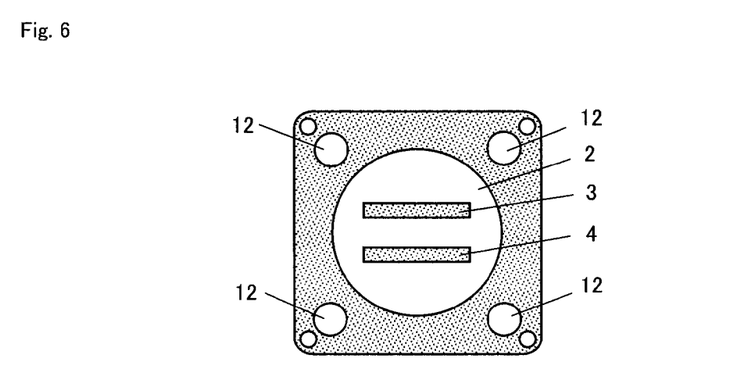
FIG. 6 is a transverse sectional view of a gas laser resonator of an embodiment 2 of the present invention when viewed similarly to FIG. 2.
Figure 7:
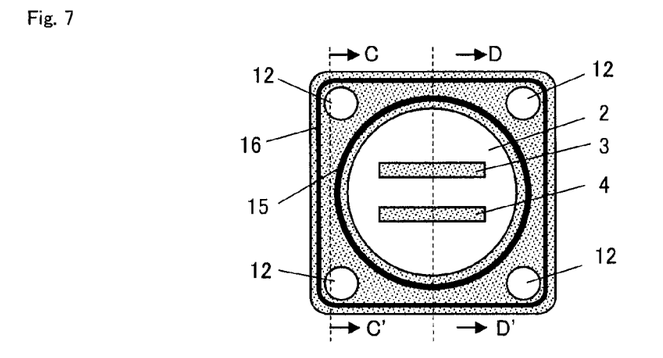
FIG. 7 is a transverse sectional view of the gas laser resonator of the embodiment 2 of the present invention when viewed similarly to FIG. 3.
Figure 8:
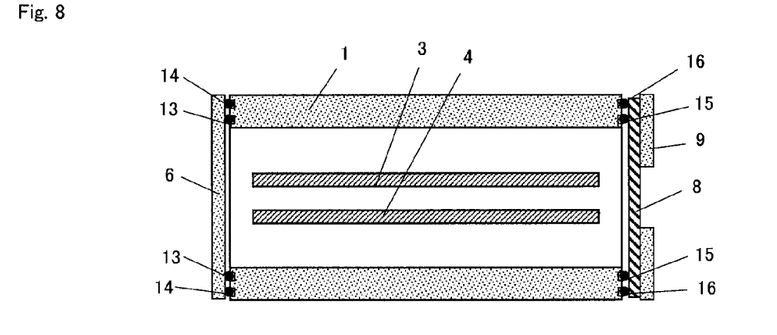
FIG. 8 is a sectional view along the line D-D' of FIG. 7.
Figure 9:
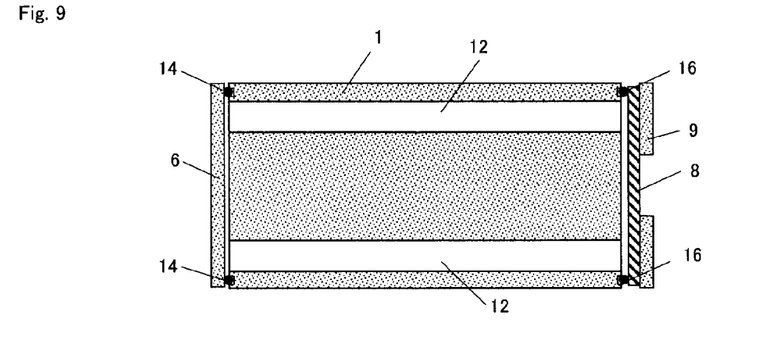
FIG. 9 is a sectional view along the line C-C' of FIG. 7.

The buffer chamber 12 communicates with an interstitial space between the gaskets 13 and 14 and another interstitial space between the gaskets 15 and 16 in FIG. 4, and the way of communicating with the interstitial spaces from a longitudinal view is seen in FIG. 5. In other words, the gaskets 13 and 15 are surrounded structurally by the buffer chamber 12 and the interstitial spaces communicating with it, and that spaces are sealed hermetically so that the pressure in those is lower than the pressure in the discharge chamber 2, specifically, it is a vacuum.

According to the above-described structure, with respect to the discharge chamber 2 and the buffer chamber 12 in terms of the relation to the atmosphere, while the discharge chamber 2 is sealed by the two gaskets 13 and 14 and the two gaskets 15 and 16, the buffer chamber 12 is sealed only by the gasket 14 and the gasket 16, as seen from FIGS. 4 and 5.

Therefore, while the pressure difference across the gasket 14 or 16 is equal to the atmospheric pressure because the buffer chamber 12 is vacuum and the exterior is the atmospheric pressure, the pressure difference across the gasket 13 or 15 is one-tenth of the atmospheric pressure that is significantly low, because the pressure in the discharge chamber 2 is a pressure of one-tenth of the atmospheric pressure and the buffer chamber 12 is vacuum. This results in the significant reduction of the leakage through the gaskets 13 and 15 that only seal the openings of the discharge chamber 2, which can significantly reduce the change of pressure in the discharge chamber 2.

Further, although the inflow of the impurity gases by leakage of air or the like toward the discharge chamber 2 passes through the buffer chamber 12, the difference between the pressures in the discharge chamber 2 and the buffer chamber 12 can be reduced, so that the inflow from the buffer chamber 12 to the discharge chamber 2 is decreased.

The year-to-year changes of the inflow of the impurity gases according to the present invention will be examined below quantitatively.

Here, the pressure change in the discharge chamber 2 after a certain period of time having elapsed is approximately obtained by multiplying the leak rate of the discharge chamber 2 by the elapsed time and then dividing it by the volume of the discharge chamber 2. The leak rate indicates the performance of the hermetical sealing and is proportional to the pressure difference. The same consideration is also applied to the buffer chamber 12.

Here, it is assumed below as typical values that the volume of the discharge chamber 2 is 1 m$^3$, the volume of the buffer chamber 12 is 1/50 m$^3$, the initial value of the laser medium gas pressure in the discharge chamber 2 is 0.1 atm, the initial value of the gas pressure in the buffer chamber 12 is zero (vacuum), and the leak rate of the discharge chamber 2 and the buffer chamber 12 is 0.001 m$^3$·atm/year at a pressure difference of 1 atm. Further, the discharge chamber 2 loses its function and reaches the end of its product life cycle when an inflow of the impurity gases (air or the like) causes a change of 1% of the pressure of the laser medium gas sealed in the discharge chamber 2, that is, 0.001 atm.

In the conventional art, since the difference between the pressure of the discharge chamber 2 and the atmosphere is 0.9 atm, the leak rate becomes 0.0009 m$^3$·atm/year, which results in that after 1.11 years have elapsed, the inflow of the impurity gases to the discharge chamber 2 makes a change of 0.001 atm and thus the discharge chamber 2 loses its function and reaches its end-of-life. Therefore, the lifetime of the discharge chamber 2 of this conventional art is 1.11 years.

According to the present invention, the following is an approximate calculation of the lifetime. It is noted that, since the volume of the discharge chamber 2 is significantly larger than that of the buffer chamber 12, the change of the gas pressure in the discharge chamber 2 is smaller than that in the buffer chamber 12. Thus, it is assumed here for the sake of simple description that the gas pressure in the discharge chamber 2 does not change and is maintained at 0.1 atm.

Figure 14:
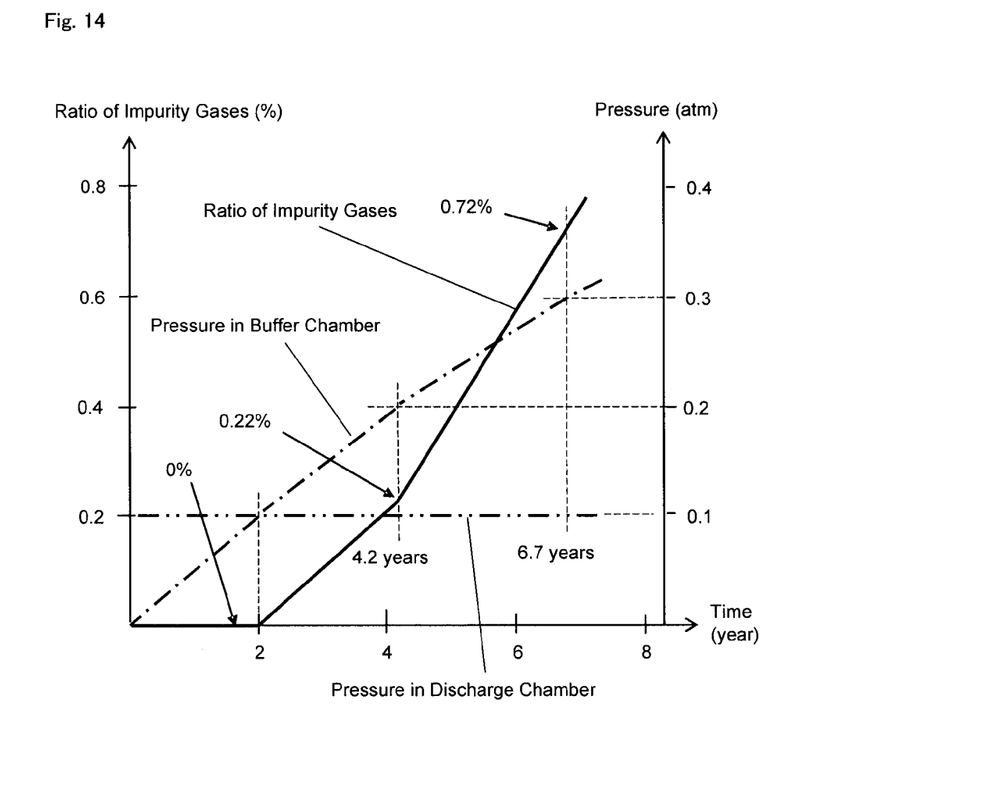
FIG. 14 is a graph showing a year-by-year changes of characteristic values in the embodiment 1.

FIG. 14 is a graph showing a year-by-year changes of characteristic values in the embodiment 1. FIG. 14 indicates the pressure in the buffer chamber 12 and the sum of the partial pressures of impurity gases, such as air, in the discharge chamber 2, where it is assumed in each period that they change in a linear manner, for simplicity.

In the buffer chamber 12, as the initial pressure is zero (vacuum), the difference between the pressure in the buffer chamber 12 and the atmosphere is 1 atm. Then, as the leak rate is 0.001 m³·atm/year and the volume of the buffer chamber 12 is 1/50 m³, the pressure in the buffer chamber 12 increases at a rate of 0.05 atm/year and reaches the pressure of 0.1 atm in two years. Until that time there is no inflow of the impurity gases, such as air, into the discharge chamber 2, since the pressure in the buffer chamber 12 is lower than the pressure in the discharge chamber 2, that is 0.1 atm, and the impurity gases have flown into the buffer chamber 12.

After that period of two years, as the difference between the pressure in the buffer chamber 12 and the atmosphere is 0.9 atm, then the leak rate becomes 0.0009 m³·atm/year, and the volume of the buffer chamber 12 is 1/50 m³, the pressure of the buffer chamber 12 increases at a rate of 0.045 atm/year and reaches 0.2 atm in 2.2 years. During this period, as the pressure of the buffer chamber 12 is 0-0.1 atm higher than the pressure in the discharge chamber 2 (0.1 atm), the impurity gases (such as air) flows into the discharge chamber 2. Since the difference between the pressures of the discharge chamber 2 and the buffer chamber 12 is 0 to 0.1 atm, the leak rate into the discharge chamber 2 becomes 0.0001 m³·atm/year or less and therefore the inflow of the impurity gases (such as air) from the buffer chamber 12 causes a change of 0.00022 atm or less within the above-described period of 2.2 years in the discharge chamber 2. At this time, as the initial value of the laser medium gas pressure in the discharge chamber 2 is 0.1 atm, the change is only 0.22% or less of the laser medium gas. Up to here, 4.2 years in total have elapsed.

After the period of 4.2 years, as the difference between the pressure of the buffer chamber 12 and the atmosphere is 0.8 atm, then the leak rate becomes 0.0008 m³·atm/year, and the volume of the buffer chamber 12 is 1/50 m³, so that the pressure of the buffer chamber 12 increases at a rate of 0.04 atm/year and reaches 0.3 atm in 2.5 years. During this period, as the difference between the pressures of the discharge chamber 2 and the buffer chamber 12 is 0.1 to 0.2 atm, the leak rate to the discharge chamber 2 is 0.0002 m³·atm/year or less and thus the flow of the impurity gases from the buffer chamber causes a change of 0.0005 atm or less in the discharge chamber 2 within 2.5 years. Although the impurity gases that can cause the change of 0.00072 atm or less in total has flown into the discharge chamber 2 from the buffer chamber 12 by this time, since the initial value of the laser medium gas pressure of the discharge chamber 2 is 0.1 atm, the inflow of the impurity gases is 0.72% or less of the laser medium gas. Up to here, 6.7 years in total have elapsed.

As set forth, in the conventional art, the pressure change by the inflow of the impurity gases reaches 1% of the laser medium gas in the discharge chamber 2 in 1.11 years. In contrast, according to the present invention, the pressure change by the inflow of the impurity gases is still 0.72% or less of the laser medium gas even after 6.7 years elapse. Therefore, it can be understood that the life can be significantly improved.

In the above discussion, from the above-described numerical relation, it can be readily understood that the buffer chamber 12 having a larger volume than 1/50 of the discharge chamber 2 results in a much longer lifetime. Therefore, in order to reduce the inflow of the impurity gases, such as air, into the discharge chamber 2 and the pressure change below 1% of the laser medium gas for about six years, which is necessary for the practical use, it is preferable that the pressure in the buffer chamber 12 is made vacuum and the volume of the buffer chamber 12 is set to 1/50 or greater than the volume of the discharge chamber 2, provided with a margin of safety.

It is noted that it is understood that the advantages of the present invention can be obtained even when the volume of the buffer chamber 12 is less than 1/50 of the discharge chamber 2. The volume of the buffer chamber 12 may be determined by the lifetime targeted and/or other various conditions into consideration.

Embodiment 2

Next, the embodiment 2 will be described. FIGS. 6-9 are sectional views of the gas laser resonator of the embodiment 2 when viewed similarly to FIGS. 2-5, respectively.

In FIGS. 6-9, the same elements as in FIGS. 1-5 are provided with the same numeral references. The differences from the embodiment 1 are as follows. While the discharge chamber 2 is shaped in a square in the embodiment 1, it is shaped in a circle here. This embodiment 2 consists of four buffer chambers 12. The buffer chambers 12 are formed in four corners in the periphery of the discharge chamber 2 in the tube 1 when viewed in the transverse sectional view of the tube 1, and each is shaped in a circle. While the discharge chamber 2 is sealed by two gaskets 13 and 14 and two gaskets 15 and 16, each opening of the four buffer chambers 12 is sealed by gasket 13 or gasket 15 only. As a result, the four buffer chambers 12 communicate with each other at the ends of the tube 1 and form one buffer chamber as a whole, which serves similarly to that in the embodiment 1.

Embodiment 3

Figure 10:
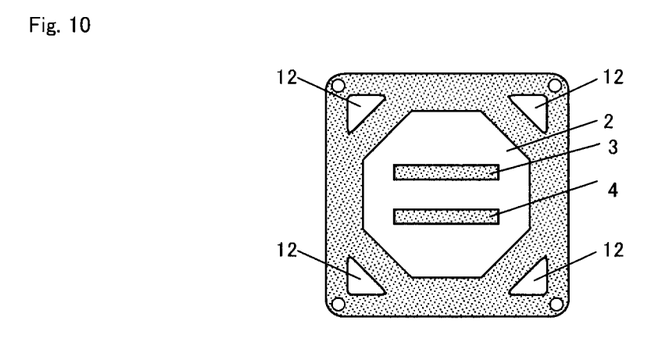
FIG. 10 is a transverse sectional view of a gas laser resonator of an embodiment 3 of the present invention when viewed similarly to FIG. 2.
Figure 11:
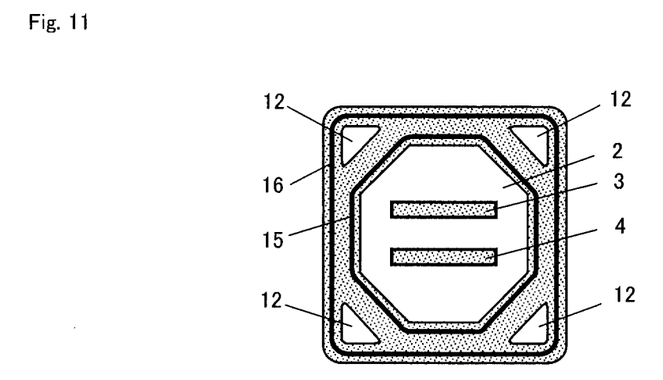
FIG. 11 is a transverse sectional view of the gas laser resonator of the embodiment 3 of the present invention when viewed similarly to FIG. 3.

Next, the embodiment 3 will be described. FIGS. 10 and 11 are transverse sectional views of the gas laser resonator of the embodiment 3 when viewed similarly to FIGS. 2 and 3, respectively.

In FIGS. 10 and 11, the same elements as in FIGS. 1-5 are provided with the same numeral references. The difference from the embodiment 2 is that the discharge chamber 2 is shaped in an octagon and each buffer chamber 12 is shaped in a triangle.

Embodiment 4

Figure 12:
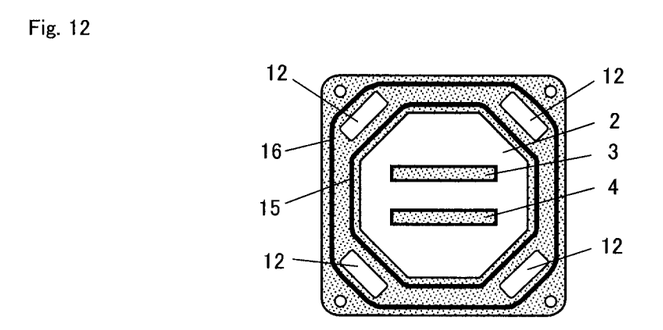
FIG. 12 is a transverse sectional view of a gas laser resonator of an embodiment 4 of the present invention when viewed similarly to FIG. 3.

Next, the embodiment 4 will be described. FIG. 12 is a transverse sectional view of the gas laser resonator of the embodiment 4 when viewed similarly to FIG. 3.

In FIG. 12, the same elements as in FIGS. 1-5 are provided with the same numeral references. The difference from the embodiment 3 is that each buffer chamber 12 is shaped in a square.

According to the embodiments 2 to 4, the discharge chamber 2 is shaped in a circle or an octagon and the buffer chambers 12 are arranged in four corners in the periphery of the discharge chamber 2 in the tube 1, so that the sectional area of the tube 1 can be effectively used allowing for a smaller external size of the tube 1 compared to the embodiment 1. Further, the symmetrical entirety allows for a good mechanical balance and thus prevents a warp that would otherwise be caused by a thermal deformation, which results in a better stability as the gas laser resonator.

Embodiment 5

Next, the embodiment 5 will be described. In the embodiment 5, the present invention is applied to an attachment part of a feed-through terminal of the gas laser resonator of the embodiment 1 of the present invention.

Figure 13:
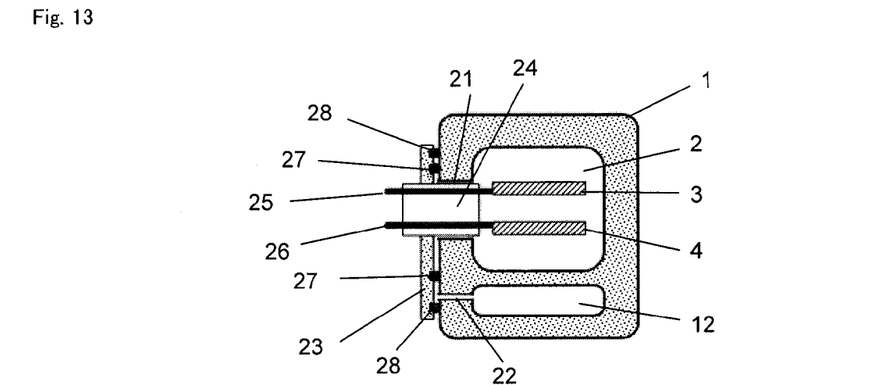
FIG. 13 is a transverse sectional view of an attachment part of a feed-through terminal of a gas laser resonator according to an embodiment 5 of the present invention when viewed similarly to FIG. 2.

FIG. 13 is a transverse sectional view of the attachment part of the feed-through terminal of the gas laser resonator of the embodiment 1 when viewed similarly to FIG. 2, in which the same elements as in FIGS. 1-5 are provided with the same numeral references.

In FIG. 13, a side of the tube 1 is formed with two through holes 21 and 22. The through hole 21 is connected to the discharge chamber 2, and the through hole 22 is connected to the buffer chamber 12. A insulating ceramics member 24 is inserted in the through hole 21 and is also inserted into a flange 23 in an airtight manner. In the ceramics member 24, conductive members 25 and 26 for electrically connecting electrodes 3 and 4 to the outside are inserted in an airtight manner. The flange 23 is attached to the side face of the tube 1 by a not-shown screw with a gasket 27 interposed only for sealing the opening of the discharge chamber 2 and a gasket 28 for sealing both openings of the discharge chamber 2 and the buffer chamber 12. On the side face of the tube 1 which the gaskets 27 and 28 contact is formed grooves in which the gaskets 27 and 28 are seated similarly to the arrangement of FIG. 1. The gaskets 27 and 28 are shaped in a square similarly to those in FIG. 1 or a circle, and their relationship is the same as the gaskets 13 and 14 or the gaskets 15 and 16 in FIG. 1.

According to the above described structure, with respect to the discharge chamber 2 and the buffer chamber 12 in terms of the relation to the atmosphere, while the discharge chamber 2 is sealed by two gaskets 27 and 28, the buffer chamber 12 is sealed by one gasket 28 only as seen from FIG. 13.

Therefore, similarly to the embodiment 1, the pressure difference across the gasket 28 is equal to the atmospheric pressure, which is the difference between the pressure of the buffer chamber 12 and the atmospheric pressure of the exterior, whereas the pressure difference across the gasket 27 is one-tenth of the atmospheric pressure that is significantly low, because the difference between the pressures in the discharge chamber 2 and the buffer chamber 12 and is one-tenth of the atmospheric pressure. Therefore, this can significantly reduce the change of the pressure in the discharge chamber 2.

Further, although the impurity gases, such as air, toward the discharge chamber 2 passes through the buffer chamber 12, the reduced difference between the pressures in the discharge chamber 2 and the buffer chamber 12 can decrease the inflow from the buffer chamber 12 to the discharge chamber 2.

It is noted that, while the pressure in the buffer chamber 12 is set lower than that of the discharge chamber 2, such as set to a vacuum in the embodiments 1 to 5, the pressure in the buffer chamber 12 may be set higher than the atmospheric pressure. This causes no inflow of the impurity such as the atmosphere to the buffer chamber 12 and, as a result, allows for the decrease of the inflow of the impurity gases, such as air, into the discharge chamber 2. In this case, the gas or its component necessary for the discharge chamber 2 may be sealed in advance in the buffer chamber 12. This also allows for supplementing the gas or its component necessary for the discharge chamber 2 to the discharge chamber 2.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A gas laser resonator comprising:
    a tube including a discharge chamber for lasing; and
    sealing parts being connected to sides of said tube for sealing said discharge chamber;
    wherein said tube further includes a buffer chamber which is different from said discharge chamber and is sealed by said sealing parts;
    wherein said sealing part comprises a first sealing member provided to seal said discharge chamber only and a second sealing member provided to seal both of said discharge chamber and said buffer chamber, and said discharge chamber and said buffer chamber are sealed hermetically so that their pressures are different from each other.

2. The gas laser resonator according to claim 1, wherein the pressure in said buffer chamber is lower than the pressure in said discharge chamber.

3. The gas laser resonator according to claim 2, wherein the pressure in said buffer chamber is a vacuum and the volume of said buffer chamber is equal to or greater than 1/50 of the volume of said discharge chamber.

4. The gas laser resonator according to claim 1, wherein said buffer chamber consists of four, and said four are formed in four corners in the periphery of said discharge chamber in said tube when viewed in a transverse sectional view of said tube.

5. The gas laser resonator according to claim 1, wherein the pressure in said buffer chamber is higher than the atmospheric pressure.

* * * * *